United States Patent
Zhang et al.

(10) Patent No.: US 6,449,312 B1
(45) Date of Patent: Sep. 10, 2002

(54) METHOD OF ESTIMATING MOTION IN INTERLACED VIDEO

(75) Inventors: Jian Zhang, Enfield (AU); Reji Mathew, Riverwood (AU)

(73) Assignee: Motorola, Inc., Schaumburg, IL (US)

( * ) Notice: Subject to any disclaimer, the term of this patent is extended or adjusted under 35 U.S.C. 154(b) by 327 days.

(21) Appl. No.: 09/589,705

(22) Filed: Jun. 8, 2000

(51) Int. Cl.[7] .................................................. H04N 7/12
(52) U.S. Cl. .................................. 375/240.16; 348/699
(58) Field of Search ....................... 375/240.15, 240.16, 375/240.17, 240.13; 348/699, 416.1; 382/236, 238; 386/109, 111

(56) References Cited

U.S. PATENT DOCUMENTS

| | | | | |
|---|---|---|---|---|
| RE35,093 E | * | 11/1995 | Wang et al. | 348/413.1 |
| 5,488,419 A | * | 1/1996 | Hui et al. | 348/699 |
| 5,565,922 A | * | 10/1996 | Krause | 348/699 |
| 5,761,398 A | * | 6/1998 | Legall | 358/1.15 |
| 6,026,195 A | * | 2/2000 | Eifrig et al. | 348/578 |
| 6,108,039 A | * | 8/2000 | Linzer et al. | 348/699 |
| 6,137,837 A | * | 10/2000 | Nemiroff et al. | 348/416.1 |
| 2002/0025001 A1 | * | 2/2002 | Ismaeil et al. | 375/240.16 |

OTHER PUBLICATIONS

Li et al., "Reliable Motion Detection/Compensation for Interlaced Sequences and Its Applications to Deinterlacing", IEEE Trans on Circuits and Systems for Video Technology, vol. 10, No. 1, pp. 23–29, Feb. 2000.*

* cited by examiner

Primary Examiner—Vu Le
(74) Attorney, Agent, or Firm—Kenneth A. Haas (57) ABSTRACT

A method of estimating motion in interlaced video involves, firstly, a frame search (61), where a search is conducted for the frame structure using a sub-sampled block matching metric (e.g. sub-sampled SAD). The locations to be searched are either fixed or dynamically determined based on the minimum frame SAD (ie best frame block match). Next, pixel errors are calculated (62) for all pixels included in the sub-sampled block matching metric. Each pixel error is first identified as belonging to one of four field patterns (e.g. even-even, even-odd, odd-even and odd-odd). For each location, pixel errors can be classified into two field patterns, either even-even and odd-odd or even-odd and odd-even (63). The pixel errors belonging to the same field pattern are added together (64) to obtain field error values (eg field SAD values). The individual field error (or field SAD) values are used to determine (77–80) the field Motion Vectors. The location of the lowest field SAD value is taken as the position of best match. All pixel errors are then summed together (65) to obtain the frame error and the location of the lowest frame error (or frame SAD) is taken as the position of best match for the frame. The frame and field Motion Vectors can be refined by using a full block matching metric within the small search window (66, 73–76).

4 Claims, 5 Drawing Sheets

REFERENCE          CURRENT

○ EVEN FIELD PIXEL
⊘ ODD FIELD PIXEL

*FIG.4*

○ EVEN FIELD PIXEL
⊘ ODD FIELD PIXEL

*FIG.5*

| SEARCH POSITION (X,Y) | FRAME SAD | | FIELD SAD EVEN-EVEN | | FIELD SAD ODD-ODD | FIELD SAD EVEN-ODD | | FIELD SAD ODD-EVEN |
|---|---|---|---|---|---|---|---|---|
| (0,0) | FRAME SAD(0,0) | = | FIELD SAD(0,0) | + | FIELD SAD(0,0) | | | |
| (1,0) | FRAME SAD(1,0) | = | FIELD SAD(1,0) | + | FIELD SAD(1,0) | | | |
| (2,0) | FRAME SAD(2,0) | = | FIELD SAD(2,0) | + | FIELD SAD(2,0) | | | |
| (N,0) | FRAME SAD(N,0) | = | FIELD SAD(N,0) | + | FIELD SAD(N,0) | | | |
| | | | | | | | | |
| (0,1) | FRAME SAD(0,1) | = | | | | FIELD SAD(0,1) | + | FIELD SAD(0,1) |
| (1,1) | FRAME SAD(1,1) | = | | | | FIELD SAD(1,1) | + | FIELD SAD(1,1) |
| (2,1) | FRAME SAD(2,1) | = | | | | FIELD SAD(2,1) | + | FIELD SAD(2,1) |
| (N,1) | FRAME SAD(N,1) | = | | | | FIELD SAD(N,1) | + | FIELD SAD(N,1) |
| | | | | | | | | |
| (0,2) | FRAME SAD(0,2) | = | FIELD SAD(0,2) | + | FIELD SAD(0,2) | | | |
| (1,2) | FRAME SAD(1,2) | = | FIELD SAD(1,2) | + | FIELD SAD(1,2) | | | |
| (2,2) | FRAME SAD(2,2) | = | FIELD SAD(2,2) | + | FIELD SAD(2,2) | | | |
| (N,2) | FRAME SAD(N,2) | = | FIELD SAD(N,2) | + | FIELD SAD(N,2) | | | |
| | | | | | | | | |
| (0,3) | FRAME SAD(0,3) | = | | | | FIELD SAD(0,3) | + | FIELD SAD(0,3) |
| (1,3) | FRAME SAD(1,3) | = | | | | FIELD SAD(1,3) | + | FIELD SAD(1,3) |
| (2,3) | FRAME SAD(2,3) | = | | | | FIELD SAD(2,3) | + | FIELD SAD(2,3) |
| (N,3) | FRAME SAD(N,3) | = | | | | FIELD SAD(N,3) | + | FIELD SAD(N,3) |
| ... | | | | | | | | |

METHOD OF ESTIMATING MOTION IN INTERLACED VIDEO

FIELD OF THE INVENTION

This invention relates to a method of estimating motion in interlaced video, and especially to a method of estimating motion in interlaced video to enable efficient coding of the interlaced video to take place.

BACKGROUND OF THE INVENTION

In a typical video coding system, the video input is in the form of consecutive frames, with each frame having a number of pixels making up each image frame. Although each frame could be individually coded and transmitted to a receiver where it can be decoded and displayed, a key point for improving video coding efficiency is to achieve bit rate saving while maintaining a given image quality. To achieve this, there are several different techniques within current video coding technologies that try to reduce the number of bits that need to be coded and transmitted. These are:

(i) motion estimation (ME) and motion compensation (MC) mode selection;
(ii) field/frame based Discrete Cosine Transformation (DCT) mode selection;
(iii) quantisation driven by rate control algorithm; and
(iv) entropy coding.

As a central component of these key operations, motion estimation and compensation seeks to remove the temporal-domain redundancy present in natural video sources. Therefore motion estimation becomes a very important part of the coding process. However motion estimation is also the most computational complex element in a video coding system, especially for real-time full-motion video communication which requires a real-time implementation of the video encoder with a large motion search window. The search window of motion displacements can be as large as ±128 pixels in the MPEG-2 Main Profile and Main Level standard, as described in ISO/IEC Standard 13818-2, Generic coding of moving pictures and associated audio information: Video 1995, and can be much larger in high-resolution and high-quality entertainment video applications.

It will therefore be appreciated that a commercial implementation of real-time block matching motion estimation (ME) involves considering memory bandwidth (the required amount of data fetching from frame buffer to the ME processor), a search pattern to be used (the motion searching complexity within a given search window or fast search algorithm), a matching metric to be used (the basic matching complexity for each matching operation or block matching metrics), and the suitability of the process for real-time hardware implementations (the ability of the process to be efficiently pipelined).

Motion estimation involves matching of a block in a current frame with a block in a reference or previous frame. A full-search block matching technique using original pixel values examines all possible motion displacements, known as motion vectors (MV), within the search window to find the best match in terms of a predetermined distortion criterion. Due to the heavy computation and extensive data fetching required between the frame buffer and the processor performing the motion estimation, a full-search motion estimation using pixel intensities is only used for motion search in relatively small search ranges. Thus, many fast searching schemes have been developed to reduce computation and data fetching. Some of these are described by J. Feng, K. T Lo and H. Mehrpour, in "MPEG Compatible Adaptive Block Matching Algorithm for Motion Estimation", published in Australian Telecommunication Networks and Applications Conference, December 1994; by J. N Kim and T. S Choi, in "A Fast Motion Estimation for Software Based Real-Time Video Coding", published in IEEE Transactions on Consumer Electronics, Vol 45, No 2, pp 417–425, May 1999; by B. Liu and A. Zaccarin, in "A Fast Algorithm for the Estimation of Block Motion Vectors", published in IEEE Transactions of Circuits and Systems for Video Technology, Vol 3, pp 730–741, April 1993; and by J. Chalidabhongse and C. C. Jay Kuo, in "Fast Motion Estimation Using Multiresolution-Spatio-Temporal Correlations", published in IEEE Transactions of Circuits and Systems for Video Technology, Vol 7, No.3, pp 477–488, June 1997.

To complicate matters, in interlaced video, alternate lines of each frame are generated at different times. For example the odd lines, forming one field, and the even lines, forming another field, are generated separately, even though the odd and even lines are interlaced with each other. Because of the time difference between generation of the two fields, looking for positional changes in a block between one frame and another causes complications. To deal with interlaced video data format, both MPEG-2 and MPEG-4 standards have functionalities to code full CCIR Rec. 601 resolution (i.e. 720X480 @60 HZ interlaced field rate). As defined in the MPEG 2 standard, video format follows the Rec. 601 interlaced form. Therefore, further consideration must be given to deal with interlaced format video. A simple approach would be to merge each pair of fields to form a frame. However, as the two fields are generated at different times (1/50th of a second apart for Rec. 601 @25 Hz), moving objects are in different places in each field and so do not merge well. Another approach would be to code the even and odd fields separately.

The decision to code in frame mode or in field mode can be made at the macro block level. A macro block, which has dimensions of 16×16 pixels, is composed of even field lines and odd field lines arranged in an interlaced format. To find the best mode of coding, results of motion estimation in the frame mode is compared with results of motion estimation in the field mode. The decision to code either in frame or field mode depends on both error residue and motion vectors (MV) produced by motion estimation.

The present invention therefore seeks to provide a method of determining a good matching reference image block from a plurality of reference image blocks in a search window of a reference image to provide a motion vector for a current image block in a current image in a video having interlaced fields, which overcomes, or at least reduces the above-mentioned problems of the prior art.

BRIEF DESCRIPTION OF THE DRAWINGS

One embodiment of the invention will now be more fully described, by way of example, with reference to the drawings, of which.

DETAILED DESCRIPTION OF THE DRAWINGS

Figure 1:
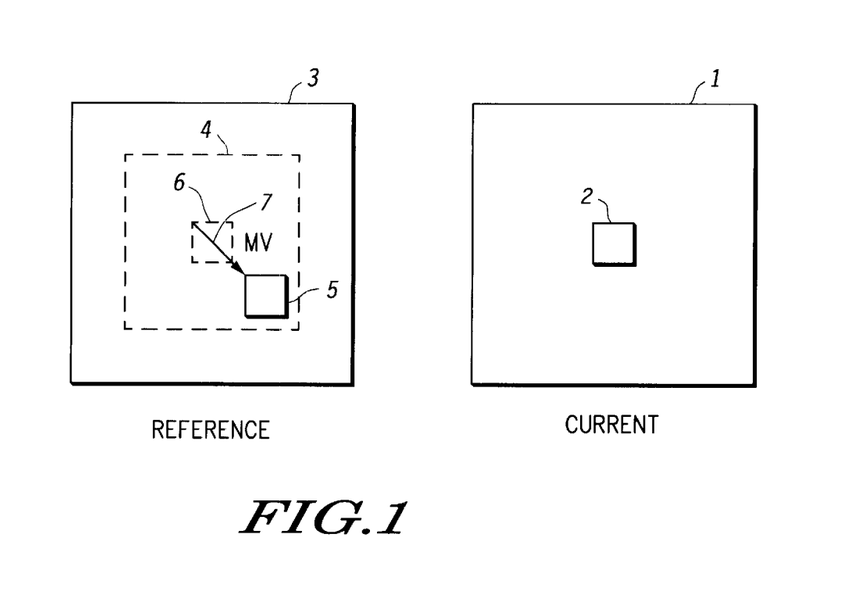
FIG. 1 shows a schematic diagram of block-based motion estimation within a search window.

As mentioned above, in order to reduce the amount of coding required for a video, it is desirable to remove the temporal-domain redundancy present in natural video sources. Therefore, it is usual to determine an image block in a previous (reference) frame which is the most similar to a particular image block within the current frame. If the blocks are very similar, the image block in the current frame does not need to be coded and only the motion vector (the amount the block has moved between the current and reference frames need be coded and transmitted). In order to determine the closest (most similar) image block in the reference frame, a search is carried out in a search window, rather than over the whole of the image frame, although that can, of course, be done, although it is computationally intensive. The search window is an area of pixels, in the reference frame, within which the system searches for a closest match to a particular block of pixels in the current frame so as to try to determine whether and how far the image block has moved from one frame to the next. This is shown schematically in FIG. 1 where the estimation process searches a search window 4 in a reference (previous) frame 3 to try to find a match 5 for an image block 2 in a current frame 1 where the matching image block 5 has moved from the previous position 6 to the new position 5 by an amount indicated by Motion Vector 7. A block matching metric, such as Sum of Absolute Differences (SAD) can be used to determine the level of similarity between the current block and a block in the previous (or reference) image. The location in the previous (or reference) image which produces the lowest SAD is taken to be the position of best match.

Figure 3:
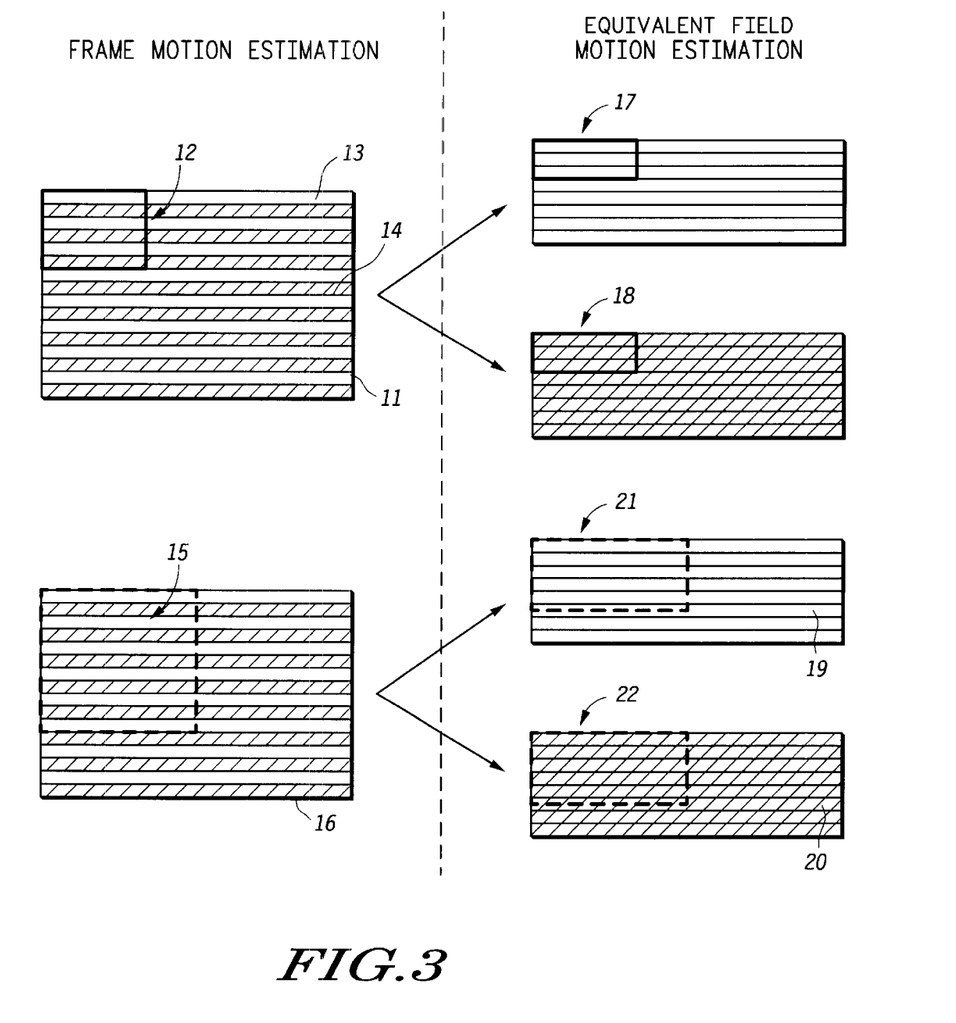
FIG. 3 shows a schematic diagram of the relationship between frame block-based motion estimation and field block-based motion estimation.

As stated above, for interlaced video, motion estimation must be conducted in the frame mode and field mode. To locate the best possible match in a given search range, frame based motion estimation and field motion estimation have, in the past, been conducted independently. This is shown in FIG. 3, where the left hand side of the drawing shows an image block 12 in a current image frame 11 having two interlaced fields, which are designated as odd field 13 and even field 14. The frame based search is performed first in a search window 15 in a reference image frame 16 with the location of the lowest frame based SAD representing the best frame-based image block match. Equation 1 shows the frame SAD calculation for a macro block (i.e. 16×16 block):

$$\text{SAD\_Frm}(dx, dy) = \sum_{x=0}^{15} \sum_{y=0}^{15} |p(x, y, t) - p(x+dx, y+dy, t-1)| \quad (1)$$

where:

SAD_Frm: Frame SAD (x,y,t): pixel in the current image at time t.

(x,y,t−1): pixel in the previous image (image at time t−1)

dx: displacement in the x-direction (x component of motion vector)

dy: displacement in the y-direction (y component of motion vector)

Field motion estimation is then performed to find the best field matching blocks.

Figure 2:
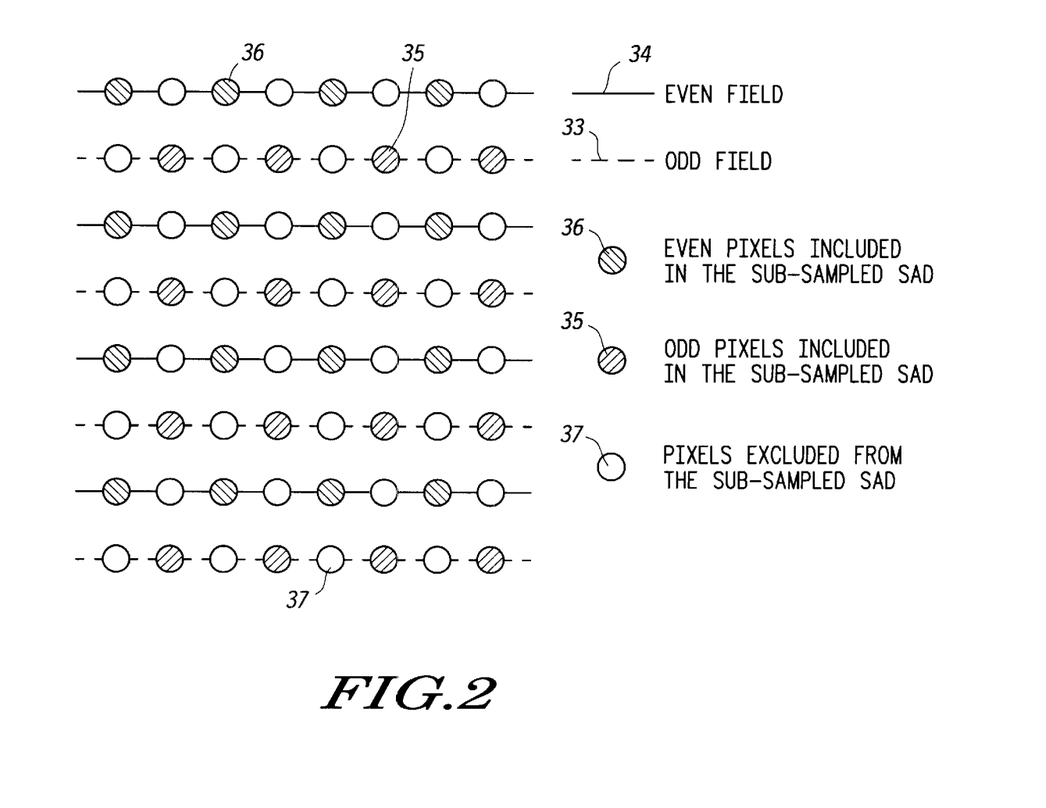
FIG. 2 shows an example of a sub-sampling pattern which may be used in the estimation procedure of FIG. 1.

As shown in the right hand side of FIG. 2, for field based motion estimation, the macro block of the current image frame is divided into two 16×8 blocks 17 and 18, one block 18 containing only even fields and the other block 17 containing only odd fields. The reference image frame is also divided into two sets 19 and 20, the first set 19 containing only odd field lines and having an odd search window 21 and the other set 20 containing even field lines and having an even search window 22. The SAD calculation for field mode is shown below in Equation 2:

$$\text{SAD\_Fld}_{k,l}(dx, dy) = \sum_{x=0}^{15} \sum_{y=0}^{8} |p_k(x, y, t) - p_l(x+dx, y+dy, t-1)| \quad (2)$$

where:

SAD_Fld: Field SAD $p_k(x,y,t)$: pixel in the current field (either even (k=0) or odd field (k=1))

$p_l(x,y,t-1)$: pixel in the previous field (either even (l=0) or odd field (l=1))

dx: displacement in the x-direction (x component of motion vector)

dy: displacement in the y-direction (y component of motion vector)

Thus, there are four patterns to drive the field predication, as listed below:

Even field to even field (k=0, l=0)

Even field to odd field (k=0, l=1)

Odd field to even field (k=1, l=0)

Odd field to odd field (k=1, l=1)

After both frame based and field based motion estimation is complete, a decision is made on the mode of coding. This involves comparing the frame based motion estimation results with the best pair of field motion estimation results.

Figure 4:
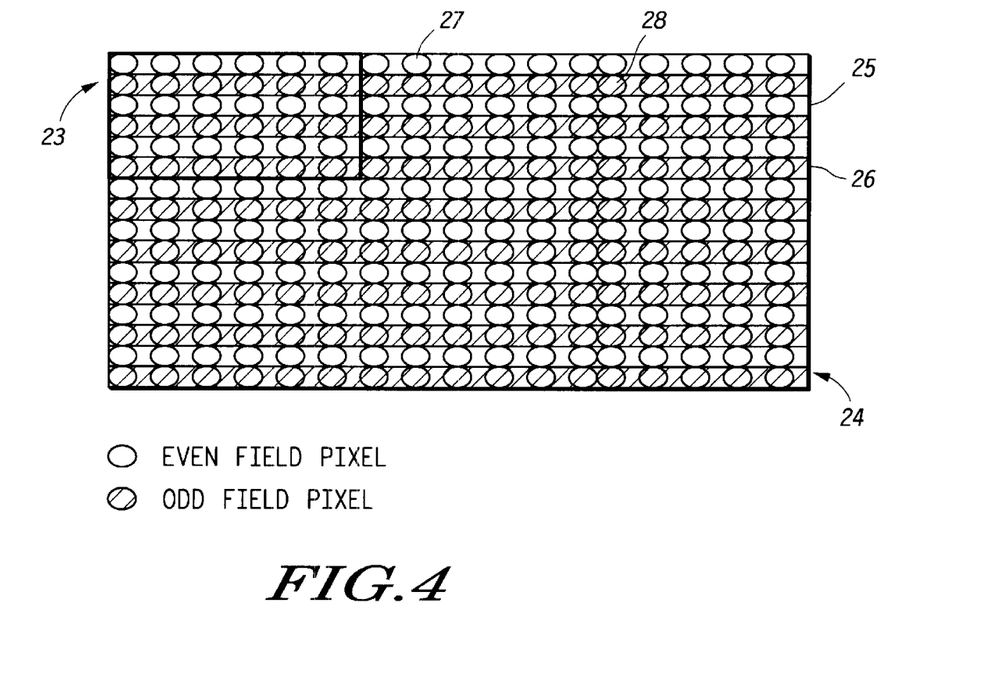
FIG. 4 shows a schematic diagram of an image block in a current frame of a video having interlaced fields.
Figure 5:
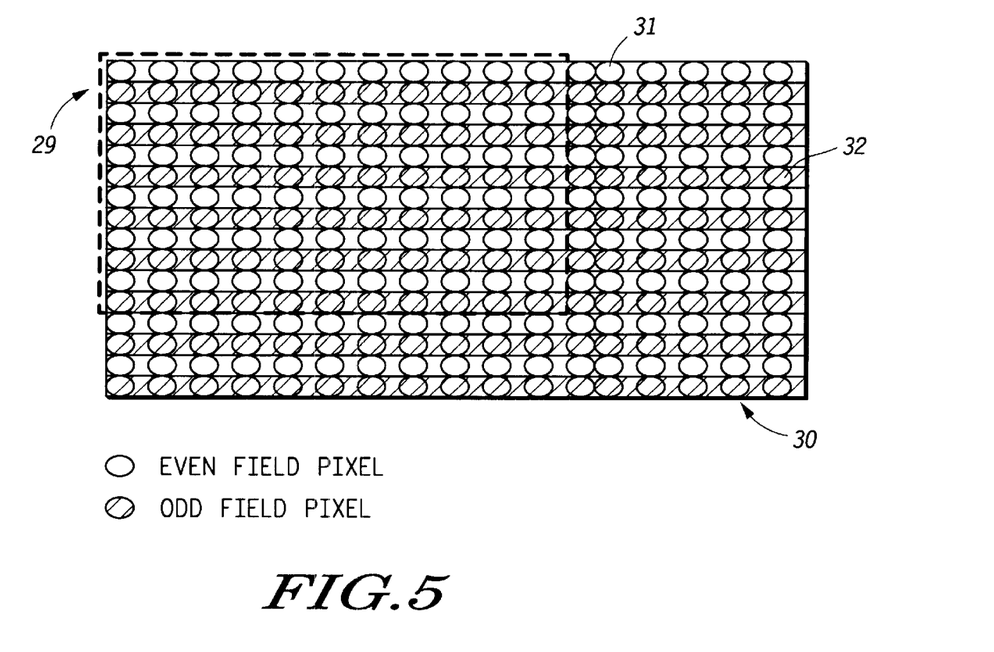
FIG. 5 shows a schematic diagram of a search window in a reference image frame of a video having interlaced fields.

In order to reduce the level of computation required to calculate both frame based and field based motion estimation, a preferred embodiment of the present invention utilises sub-sampling of the pixels. FIG. 4 illustrates an image block 23 in a current image frame 24 having two interlaced fields, which are designated as odd field 25 and even field 26. Each field has a number of pixels, so that, in this case, the shaded pixels 27 are odd field pixels and the unshaded pixels 28 are even field pixels. The search is performed in a search window 29 in a reference image frame 30, as illustrated in FIG. 5, again having odd field pixels 31 and even field pixels 32.

FIG. 2 shows part of the pattern of pixels in odd and even fields. Here, the even field 34 is shown using a solid line and the odd field 33 is shown by a dotted line. As illustrated in FIG. 2, by carrying out the SAD on a sub-sampled pattern of pixels at every search location in the frame, the computation can be reduced. In this case, every second even pixel 36 in the even field is included in the sub-sampled SAD, as is every second odd pixel 35, although the even and odd pixels are arranged alternatively, as shown. Thus, half the pixels 37 in both the odd and even fields are excluded from the sub-sampled SAD. To exploit the interlaced structure of an input frame when employing a sub-sampled block matching metric the sub-sampling pattern needs to include pixels of both fields that make up the frame. In this way each sub-sampled pixel location can be grouped into either of two categories (i.e. either belonging to even field or belonging to odd field).

Figure 6:
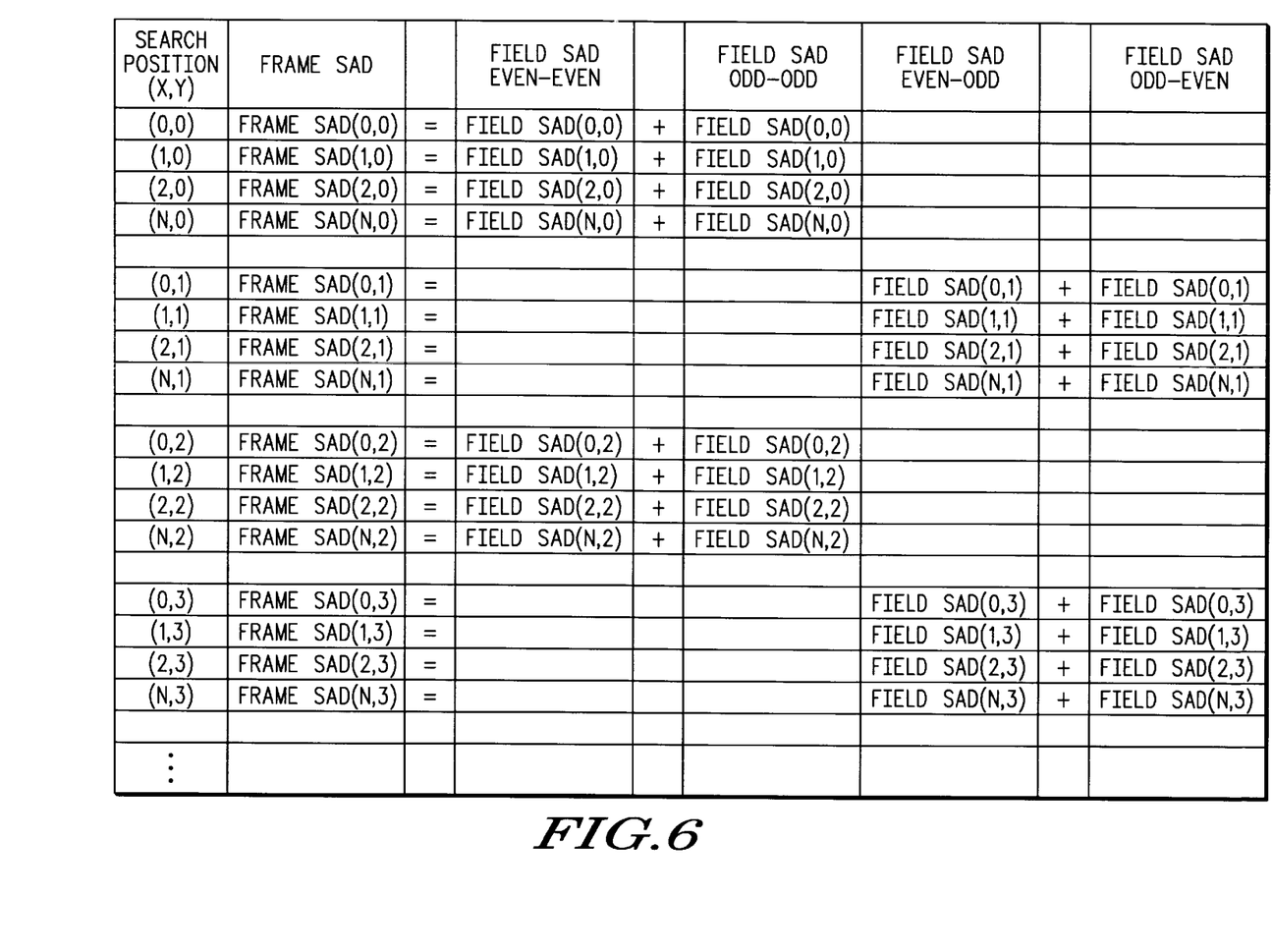
FIG. 6 is a table showing the relationship between frame and field Sum of Absolute Differences (SAD) calculations used in the present invention.

The correspondence between search locations and respective field combinations is shown in FIG. 6. For a block in the current image, with coordinates (J,K), a search is conducted centered on this location. For example, at an offset (x,y), the block in the current image at coordinates (J,K), is compared with a block in the reference image at coordinates (J+x, K+y). For each searched location, the corresponding field combinations vary depending on whether the K+y value is even or odd. In FIG. 6, the offset values (x,y) and corresponding field errors or SAD combinations are shown. It is assumed that the coordinates of the block in the current image are always even, that is J and K are always assumed to be even. This is mostly the case since block sizes are almost always even (for example 8×8 blocks, or 16×16 blocks). The search position offsets are specified by (x,y) coordinates in FIG. 6. The value x is the horizontal offset from the horizontal location of the block in the current image. The value y is the vertical offset from the vertical location of the block in the current image. At every offset location searched, there are two field combinations, either even-even and odd-odd, or even-odd and odd-even. Examples of offset locations and corresponding field combinations are presented in FIG. 6.

With no offset, that is at the (0, 0) location in FIG. 6, the two corresponding field combinations are even-even and odd-odd. The Sum of Absolute Differences (SAD) therefore is calculated for the pair of field combinations. The SAD for the frame is obtained by adding together the even-even and odd-odd field SAD values. For the search offset location (1, 0) (where x=1 and y=0), the two field components are again even-even and odd-odd. Field SAD therefore is calculated for the even-even and odd-odd combinations and these two resulting SAD values are summed together to obtain the frame SAD at (1, 0). As shown in FIG. 6, for all locations where the y or vertical component is zero, the field combinations are always even-even and odd-odd. For the offset location (0, 1) (where x=0 and y=1) the field combinations are even-odd and odd-even. Summation of the even-odd and odd-even field SAD values produces the frame SAD at (0, 1). As illustrated in FIG. 6, for all locations where the y or vertical component is equal to one, the field combinations are always even-odd and odd-even.

It is therefore clear from the examples illustrated in FIG. 6 that for all occasions where the y or vertical component is even, the field combinations are always even-even and odd. When the y or vertical component is odd, the field combinations are even-odd and odd-even. FIG. 6 also shows that at every search location the respective field SAD values can be summed together to obtain the frame SAD.

Figure 7:
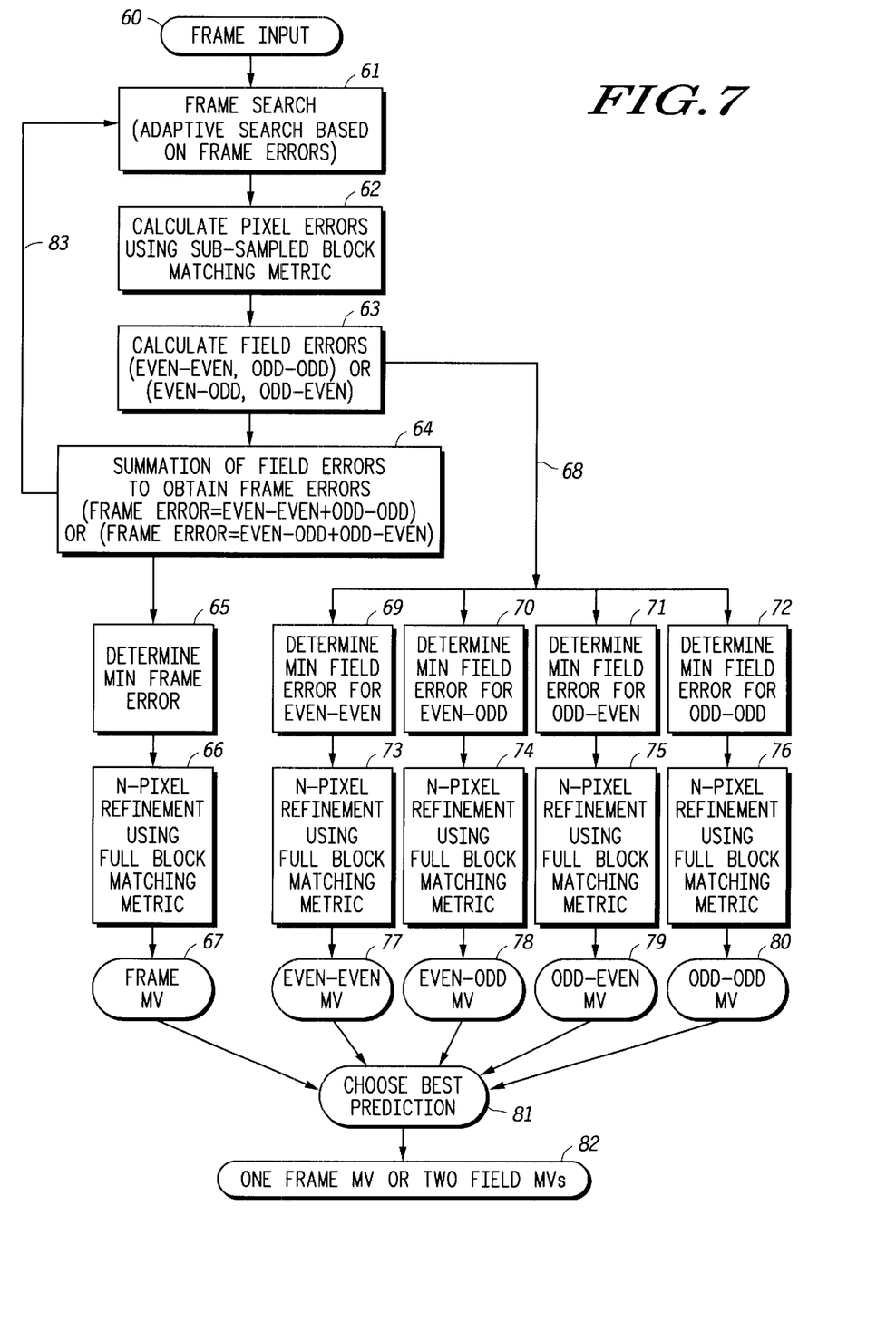
FIG. 7 is a schematic flow chart of on embodiment of a method according to the present invention.

A flow chart describing the operation of on embodiment of a method of determining a good matching reference image block from a plurality of reference image blocks in a search window of a reference image to provide a motion vector for a current image block in a current image in a video having interlaced fields is shown in FIG. 7. An input frame is first received from a video input source, as indicated at step 60. The input frame is divided into non-overlapping blocks of N pixels wide by M pixels high (eg 16×16 image blocks). For each block in the input frame, locations within the reference (or previous) frame that are to be searched are identified at step 61. The locations to be searched can be either fixed or made dynamic depending on intermediate frame matching results, as indicated by feedback loop 83. For each location that is searched, a matching metric (such as absolute error) is calculated at step 62 for a sub-sampled set of pixels in the block. This means that the error between pixels in a block in the current image and the corresponding pixels in a block in the reference image is calculated. The error between pixels is calculated only for a sub-sampled set of pixels to reduce computational complexity. In step 63, the pixel errors are then grouped according to the corresponding fields that the pixel pairs originate from. For each searched location, the pixel errors can be grouped into even-even (pixels from even field of current image and pixels from even field of reference image) and odd-odd (pixels from odd field of current image and pixels from odd field of reference image) field combinations; or even-odd (pixels from even field of current image and pixels from odd field of reference image) and odd-even (pixels from odd field of current image and pixels from even field of reference image) field combinations. The summation of pixel errors belonging to the same field combinations provide the field error values in step 63. The four field errors calculated in step 63 are then taken (step 68) to identify the minimum field error for each field combination, at steps 69–72, by comparing the field errors for every searched location. In this way the location that produces the minimum error for field combination even-even (step 69), even-odd (step 70), odd-even (step 71), and odd-odd (step 72) are determined.

Centered on the best matching field locations that were determined by employing the sub-sampled block matching metric in steps 69–72, a small search is conducted (N pixels by N pixels) using a full block matching metric in steps 73–76. A full block matching metric for fields implies that all pixels within the corresponding fields are used in calculating the block matching metric. A small search (N pixels by N pixels) is conducted at step 73 centered on the best even-even location determined by employing the sub-sampled matching metric from step 69. Similarly a small search is also conducted for the even-odd at step 74, odd-even at step 75 and odd-odd at step 76 field combinations. For each field combination, the best matching location within the small search window is chosen in respective steps 77–80 to determine the field Motion Vectors. The location with the lowest error for the even-even search determined at step 73 is used to determine at step 77 the even-even field Motion Vector. In a similar fashion the even-odd field Motion Vector, odd-even field Motion Vector and odd-odd field Motion Vector values are determined in respective steps 78, 79 and 80.

The calculated field error values from step 63 are also summed together in step 64 by adding either the even-even and odd-odd field errors or the even-odd and odd-even field errors to produce a frame error value. This frame error value can be used as an input to the feedback loop 83 to dynamically adjust the search pattern 61. The frame error values for all locations searched are then compared at step 65 to find the location with the minimum frame error. At this point an extra refinement stage 66 can be introduced, in which a small search (N pixels by N pixels) is conducted centered on the reference frame location with minimum error determined in step 65. During the refinement stage 66, all pixels within the blocks are used to calculate the block matching metric. Since all pixels are used, the matching metric is referred to as a full block matching metric. The location with the lowest error within the small search window from step 66 is chosen at step 67 to determine the frame Motion Vector.

A decision is then made at step 81 to determine the best coding mode, that is, either frame or field mode. This decision can be based on a number of factors including the frame and field block matching values (such as Sum of Absolute Difference (SAD)) and the magnitude of the frame and field Motion Vector values. As an example, field mode is chosen if the summation of the error or SAD of two field components is substantially lower than the corresponding frame error or SAD. An implementation of this example is shown below where the combined field error is increased by a factor of BIAS (eg 500). The field mode is only chosen if the combined field SAD with BIAS is lower than the frame SAD.

$$\text{COMBINED\_SAD\_Fld} = \text{MIN}\{(\text{SAD\_Fld}_{even-even} + \text{SAD\_Fld}_{odd-odd}), (\text{SAD\_Fld}_{even-even} + \text{SAD\_Fld}_{odd-even}), (\text{SAD\_Fld}_{even-odd} + \text{SAD\_Fld}_{odd-odd}), (\text{SAD\_Fld}_{even-odd} + \text{SAD\_Fld}_{odd-even})\}$$

If COMBINED_SAD_Fld+BIAS<SAD_Frm
then
   Choose Field Mode, (Two Field MVs)
Else Frame Mode, (One Frame MV)
Where:
$\text{SAD\_Fld}_{even-even}$: SAD for even-even field combination
$\text{SAD\_Fld}_{odd-odd}$: SAD for odd-odd field combination
$\text{SAD\_Fld}_{even-odd}$: SAD for even-odd field combination
$\text{SAD\_Fld}_{odd-even}$: SAD for odd-even field combination
SAD_Frm: SAD for Frame
BIAS=500
MIN { }: Minimum of the specified set of values.
COMBINED_SAD_Fld: Combined SAD values of two fields The output of the decision step 81 is the final Motion Vector value provided at step 82. This final Motion Vector can be either one Frame Motion Vector or two Field Motion Vectors.

Thus, it will be seen that the search is conducted only for the frame structure. An independent field search is not conducted. The SAD that is calculated for the frame structure is calculated as two components and these components are used to determine the field Motion Vectors. An important aspect to note is that a sub-sampled SAD is used at every search location in the frame. To exploit the interlaced structure of an input frame when employing a sub-sampled block matching metric the sub-sampling pattern should include pixels of both fields that make up the frame. In this way each sub-sampled pixel location can be grouped into either of two categories (i.e. either belonging to even field or belonging to odd field). In the sub-sampled SAD pattern used for a 16×16 block, equal number of pixels from both fields within the 16×16 block are used in the SAD calculation. The Motion Vector refinement is carried in the last stage using a full block matching metric (e.g. a full block SAD) for both the frame and field Motion Vectors. This refinement process includes performing a small search centered on the Motion Vector obtained from the first stage where a sub-sampled block matching metric was used. The operation, can thus be briefly characterized as including the following steps:

1. Frame search: A search is conducted for the frame structure using a sub-sampled block matching metric (eg sub-sampled SAD). The locations to be searched are either fixed or dynamically determined based on the minimum frame SAD (ie best frame block match).
2. Pixel Errors: Pixel errors are calculated for all pixels included in the sub-sampled block matching metric.
3. Frame Error: All pixel errors are summed together to obtain the frame error.
4. Field Error: Each pixel error is first identified as belonging to one of four field patterns (e.g. even-even, even-odd, odd-even and odd-dd). For each location, pixel errors can be classified into two field patterns, either even-even and odd-odd or even-odd and odd-even. The pixel errors belonging to the same field pattern are added together to obtain field error values (eg field SAD values).
5. Frame and Field MVs: The individual field error (or field SAD) values are used to determine the field MVs. The location of the lowest field SAD value is taken as the position of best match. The location of the lowest frame error (or frame SAD) is taken as the position of best match for the frame.
6. MV refinement: The MVs are refined by performing a small search centred on the MVs obtained from step 5. The frame and field MVs are refined by using a full block matching metric within the small search window.

It will be appreciated that although only one particular embodiment of the invention has been described in detail, various modifications and improvements can be made by a person skilled in the art without departing from the scope of the present invention.

What we claim is:

1. A method of determining a good matching reference image block from a plurality of reference image blocks in a search window of a reference image to provide a motion vector for a current image block in a current image in a video having interlaced fields, the method comprising the steps of:

for each reference image block in the search window:
   calculating a matching criterion between each of a first plurality of discrete image elements in the current image block and each of a second plurality of discrete image elements in the reference image block, at least a first set of discrete image elements in the first plurality being in a first field of the current image and a second set of discrete image elements in the first plurality being in a second field of the current image, at least a first set of discrete image elements in the second plurality being in a first field of the reference image and a second set of discrete image elements in the second plurality being in a second field of the reference image;
   classifying the matching criteria according to whether the discrete image element of the first plurality is in the first field or the second field of the current image and whether the discrete image element of the second plurality is in the first field or the second field of the reference image;
   summing the matching criteria for each combination of sets of the discrete image elements in the current and reference images to provide two field errors out of a possible four combinations of discrete image elements which are in the:
first field of the current image and first field of the reference image,
first field of the current image and second field of the reference image,
second field of the current image and first field of the reference image,
second field of the current image and second field of the reference image; and
   combining the two field errors so as to include both fields in both images to provide a frame error;
determining which reference image block in the search window corresponds to a good field error for each of the four combinations to provide four field candidate reference image blocks;
determining which reference image block in the search window corresponds to a good frame error to provide a frame candidate reference image block; and comparing the good field error for each of the four combinations with the good frame error, to determine which of the candidate reference image blocks provides a good candidate reference image block for the current image block.

2. A method of determining a good matching reference image block from a plurality of reference image blocks in a search window of a reference image according to claim 1, wherein the step of calculating a matching criterion between each of a first plurality of discrete image elements in the current image block and each of a second plurality of discrete image elements in the reference image block, includes:

subsampling the first and second pluralities of discrete image elements in the current and reference image blocks in a predetermined manner such that matching criteria are not calculated for all discrete image elements in the image blocks.

3. A method of determining a good matching reference image block from a plurality of reference image blocks in a search window of a reference image according to claim 2, further comprising, after the step of determining which reference image block in the search window corresponds to a good field error for each of the four combinations, the steps of, for each of the four determined reference image blocks:

determining a smaller search window having the field candidate reference image block therein; and for each reference image block in the smaller search window:

calculating a matching criterion between all the discrete image elements in the current image block and all of the discrete image elements in the reference image block;

summing the matching criteria; and determining which reference image block in the smaller search window corresponds to a good field error to provide the field candidate reference image block.

4. A method of determining a good matching reference image block from a plurality of reference image blocks in a search window of a reference image according to claim 2, further comprising, after the step of determining which reference image block in the search window corresponds to a good frame error, the steps of:

determining a smaller search window having the frame candidate reference image block therein; and for each reference image block in the smaller search window:

calculating a matching criterion between all the discrete image elements in the current image block and all of the discrete image elements in the reference image block;

summing the matching criteria;

determining which reference image block in the smaller search window corresponds to a good frame error to provide the frame candidate reference image block.

* * * * *